(No Model.)  2 Sheets—Sheet 1.
P. E. JAY.
Apparatus for Overcoming the Dead Point in Crank Movement.
No. 234,406. Patented Nov. 16, 1880.
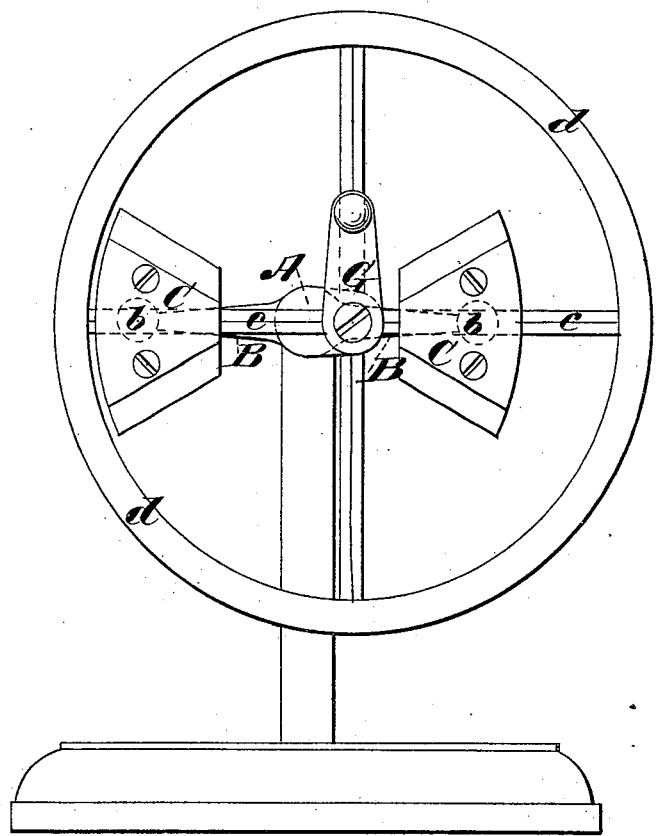

(No Model.) 2 Sheets—Sheet 2.
P. E. JAY.
Apparatus for Overcoming the Dead Point in Crank Movement.
No. 234,406. Patented Nov. 16, 1880.
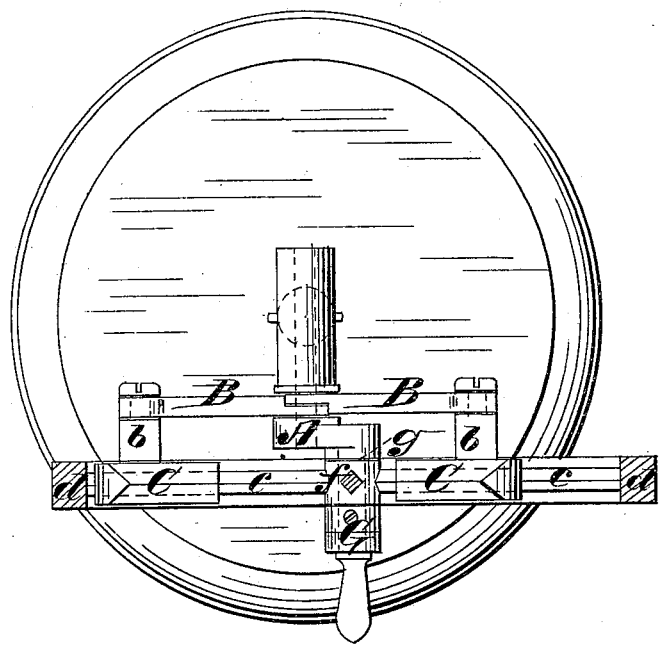
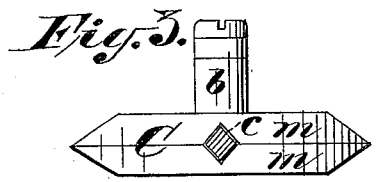
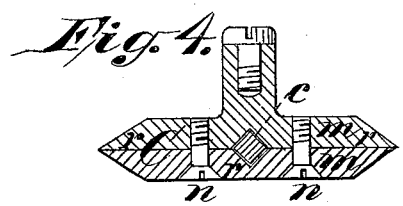
WITNESSES.
H. N. Parker
E. Wells Jr.
INVENTOR.
Pierre E. Jay.
PER James A. Whitney
Att'y.

UNITED STATES PATENT OFFICE.

PIERRE E. JAY, OF NEW YORK, N. Y.

APPARATUS FOR OVERCOMING THE DEAD-POINT IN CRANK-MOVEMENTS.

SPECIFICATION forming part of Letters Patent No. 234,406, dated November 16, 1880.

Application filed April 28, 1880. (No model.)

*To all whom it may concern:*

Be it known that I, PIERRE E. JAY, of the city, county, and State of New York, have invented an Improved Apparatus for Overcoming the Dead-Point in Crank-Movements, of which the following is a specification.

This invention relates to that class of apparatus in which a movable weight or weights is so applied in connection with a crank that when the crank is brought to the position of a "dead-center," so termed, a weight is projected at an angle to the crank to carry the latter past its dead-center, thereby preventing the stopping of the crank at such points of its rotation.

My invention comprises certain novel mechanical means, whereby great simplicity and ease of manufacture are combined with strength, durability, and a very efficient operation.

Figure 1 is a front view of an apparatus embracing my said invention. Fig. 2 is a plan view and partial horizontal section thereof; and Figs. 3 and 4 are detail views of one part of the said apparatus.

A is a fixed shaft or bearing, to which are pivoted the inner end of two arms, B, which extend in substantially opposite directions, and the outer end of each of which is pivoted to one side of a sliding weight, C, as represented at $b$ in Fig. 2, and also in dotted outline in Fig. 1. These weights slide upon two oppositely-radiating spokes, $c$, which may, when desired, be provided with a rim, $d$, to constitute a fly-wheel. These spokes $c$ extend in opposite directions from a central hub, $f$. This hub works upon a suitable bearing or journal, $g$, which is offset from the shaft or bearing A, as indicated in Fig. 2. In other words, the axis of the bearing on which the hub $f$ rotates is situated at some distance from and parallel with the axis of the shaft A, on which the inner ends of the arms B are pivoted, as hereinbefore explained. The spokes $c$ are rectangular in their cross-section, as represented in Figs. 3 and 4, and pass through longitudinal slots of corresponding shape in the weights C. In order that these weights C may be properly attached in place upon the spokes $c$, each of the said weights is made in two parts—that is to say, is composed of two lateral sections, $m$, held together by screws $n$, all as represented in Figs. 3 and 4.

The crank is shown at G, and is formed upon or attached to the hub $f$, so as to rotate therewith. When the crank is brought to one of its dead-points one of the weights is projected toward the outer extremity of the spoke upon which it is placed, and being thereby brought farther from the axis of motion of the crank operates to turn the latter past its dead-point. When the crank has reached its opposite dead-point the other of the weights is projected toward the extremity of the spokes aforesaid, and in like manner carries the crank opposite its second dead-point, and so on, each dead-point of the crank being overcome by the action of a weight projected toward the extremity of its supporting-spoke.

It will, of course, be observed that the same operation which projects one of the weights toward the outer extremity of its spoke also moves inward the other weight toward the inner extremity of the opposite spoke.

It will be observed that the spokes $c$, being of rectangular form in their cross-section and being passed through slots of corresponding shape in the weights C, prevent any twisting or axial motion of said weights upon the spokes, and thereby prevent torsion upon the pivots by which the arms B are connected with the said weights, and also prevent a twisting action upon the arms themselves, which in practice would be extremely detrimental to the operation and durability of the machine.

It is also to be observed that by the construction hereinbefore specified of the said weights C the rectangular slots may be very readily formed in the weights, and the weights themselves may be with very great convenience attached in place to slide upon the spokes.

It is to be observed that for very light work, especially when a high speed of the crank is required, only one of the arms B, with its attached weight C, need be used, inasmuch as the velocity required in throwing the crank opposite one of its dead-points will, in the case of light machinery, as just mentioned, be in very many cases sufficient to carry it past the other dead-point.

What I claim as my invention is—

1. A spoke or spokes, $c$, having rectangular cross-section, in combination with a weight or weights, C, bearing $g$, bearing A, and arm or arms B, all substantially as and for the purpose herein set forth.

2. A weight or weights, C, composed of lateral sections $r$, secured together by screws or bolts $n$, in combination with a radial spoke or spokes, $c$, bearing $g$, bearing A, and radial arm or arms B, all substantially as and for the purpose herein set forth.

PIERRE E. JAY.

Witnesses:
H. F. PARKER,
JAMES A. WHITNEY.